United States Patent [19]

Benton et al.

[11] 4,182,700
[45] Jan. 8, 1980

[54] ELASTOMERIC POLYURETHANE FILM CONTAINING DISPERSED DISCRETE AGGREGATES OF LIQUID CRYSTAL AND METHOD OF MAKING THE SAME

[76] Inventors: William J. Benton, 1046 Murray Hill Ave.; Joseph R. Quigley, 6611 Ridgeville St., all of Pittsburgh, Pa. 15217

[21] Appl. No.: 915,556

[22] Filed: Jun. 14, 1978

Related U.S. Application Data

[63] Continuation-in-part of Ser. No. 706,962, Jul. 20, 1976, abandoned.

[51] Int. Cl.² ................................................ C09K 3/34
[52] U.S. Cl. .................................. 260/37 N; 252/408; 260/18 TN; 264/236; 264/210.2; 264/210.6; 264/211; 428/1
[58] Field of Search ........ 252/408; 260/37 N, 18 TN, 260/77.5 AP, 77.5 AC; 264/211, 210 R, 236

[56] References Cited

U.S. PATENT DOCUMENTS 3,872,050  3/1975  Benton et al. .................... 260/37 N

*Primary Examiner*—Jay H. Woo

[57] ABSTRACT

Polyurethane elastomer films containing dispersed discrete aggregates of liquid crystals can be produced with improved color response. The liquid crystal aggregates are dispersed in uncured polyurethane elastomer precursors which are cured as a film. After the curing process has commenced but before the curing process has been completed, the partially cured film is subjected to shear stresses to change the shape of the partially cured material which thereafter is allowed to complete the cure in the altered shape.

9 Claims, 1 Drawing Figure

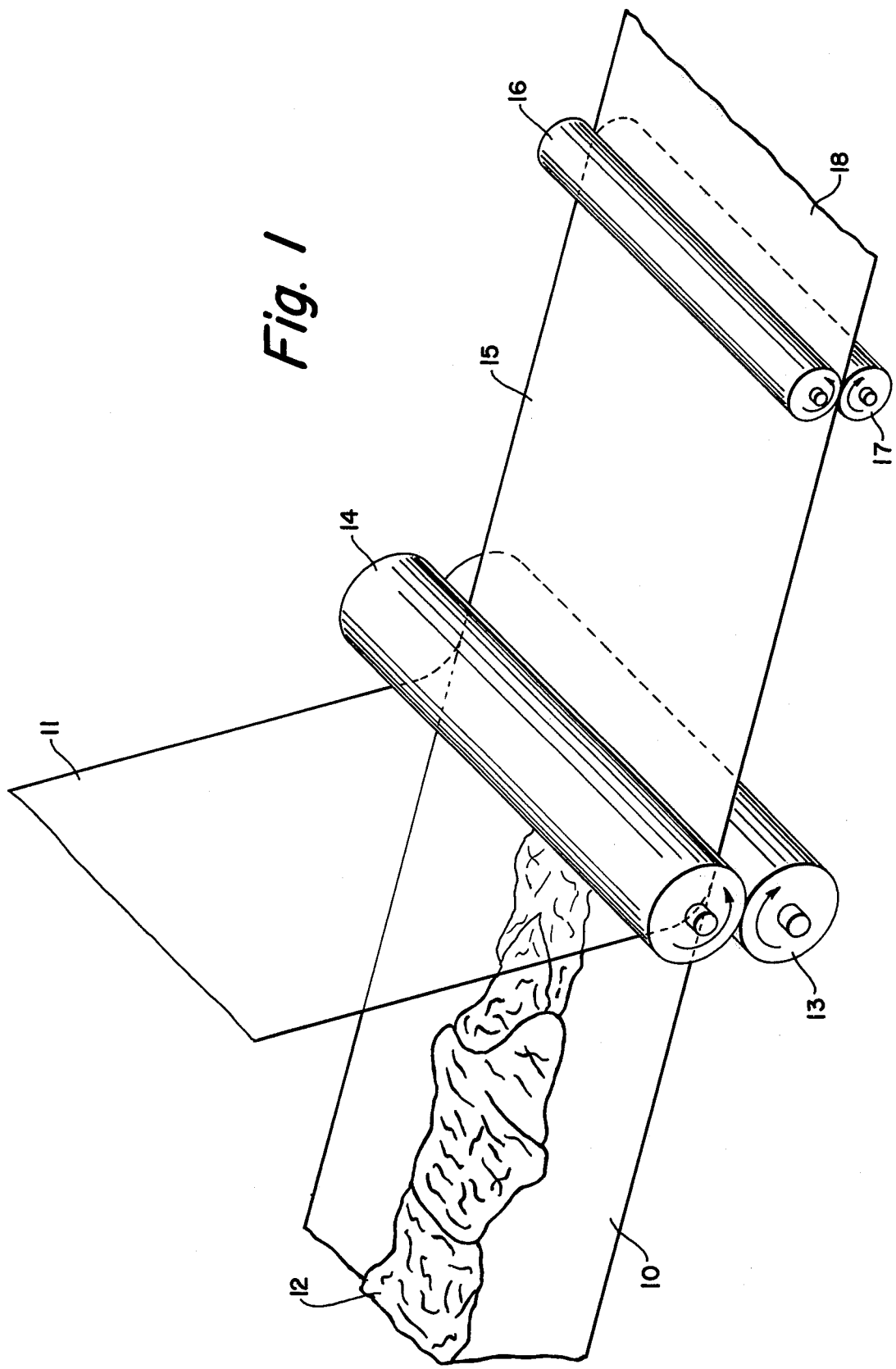

ELASTOMERIC POLYURETHANE FILM CONTAINING DISPERSED DISCRETE AGGREGATES OF LIQUID CRYSTAL AND METHOD OF MAKING THE SAME

CROSS-REFERENCES TO RELATED APPLICATIONS (IF ANY)

This invention is a continuation-in-part of co-pending application Ser. No. 706,962, filed July 20, 1976, now abandoned.

BACKGROUND OF THE INVENTION

1. Field of the Invention

The invention relates to polyurethane elastomer films containing dispersed discrete aggregates of liquid cystals.

2. Description of the Prior Art

Polyurethane elastomer films containing dispersed discrete aggregates of liquid crystals are described in U.S. Pat. No. 3,872,050. Polyurethane films prepared in accordance with that patent exhibit useful visible color responses at selected temperature ranges or when exposed to mechanical stresses or both—according to the specific composition of the dispersed liquid crystal phase. In accordance with that patent, it is possible to disperse more than 20 percent by weight of the film as discrete aggregates of liquid crystals. Nevertheless there remains a need for further improvement in the visual color response of such films.

SUMMARY OF THE INVENTION

According to the present invention, polyurethane elastomer films containing dispersed aggregates of liquid crystals are produced in accordance with the teachings of the aforementioned U.S. Pat. No. 3,782,050. We have found that the visible color response of the resulting films can be improved by providing shear stresses to the elastomer film after it has started curing and before it has completed its cure. The curing mechanism occurs through reaction of isocyanate groups with compounds having reactive hydrogen sites, as determined by the Zerewitinoff test. Such reactive hydrogen sites appear in hydroxyl-terminated organic compounds such as polyols.

In earlier application Ser. No. 706,962, the present invention was described as an improvement over the earlier invention set forth in U.S. Pat. No. 3,872,050, i.e., an improvement in elastomer films containing 20 weight percent or more of liquid crystal as discrete aggregates. Work subsequent to the filing of the application Ser. No. 706,962 has led to the appreciation that the present invention achieves visually discernible and useful elastomer films containing as little as 5 weight percent of discrete aggregates of the liquid crystals. As originally presented, the present invention also enhances the visible response of elastomer films containing 20 weight percent and more of the discrete aggregates of liquid crystals. In addition, the invention presents visually useful elastomer films containing from about 5 to 20 weight percent of the discrete aggregates of liquid crystals.

The required shear stress can be applied by stirring or kneading the partially cured elastomer or, preferably, by passing a preformed film through squeezing rolls which serve to compress the film thickness and extend the film width. The shear stress may be introduced by forcing the polymerizing mass through an extrusion die. We believe that such shear stresses serve to change the physical form of the dispersed liquid crystal aggregates from the essentially spherical form which they tend to assume as a dispersed phase in the unpolymerized, polymerizable polyurethane elastomer precursor mixture. If the polyurethane continuous phase is allowed to cure undisturbed, the dispersed aggregates of liquid crystals will retain their initial spherical shape and produce useful films as described in U.S. Pat. No. 3,872,050 supra. However if the shape of the polymerizing polyurethane continuous phase is altered by introducing some mechanical strains into the mixture after some polymerization has occurred and while further polymerization is anticipated, the shape of the dispersed aggregates of liquid crystals tends to be distorted from the spherical shape to some other shape and as an unexpected consequence, the visible color response of the resulting film is superior to the visible color response of otherwise identical films which have been undisturbed throughout their curing cycle.

BRIEF DESCRIPTION OF THE DRAWING(S)

FIG. 1 is a fragmentary illustration of apparatus adapted to practice the present invention.

DESCRIPTION OF THE PREFERRED EMBODIMENT(S)

Materials—The present invention employs films which have a polyurethane elastomer continuous phase and a dispersed phase consisting of discrete aggregates of liquid crystals. The polyurethane elastomer includes organic polyisocyanates such as toluene diisocyanate, polyphenylene diisocyanate, aliphatic diisocyanates and other polyisocyanates which are well-known in the polyurethane arts. The polyisocyanate also may be in the form of a prepolymer which is the polyisocyanate-terminated reaction product of at least one polyisocyanate with at least one polyol, or other organic composition containing reactive hydrogens as determined by the Zerewitinoff test. Such polyisocyanates are known as polymeric isocyanates and are also well-known in the polyurethane arts. The polyisocyanate may be supplied in the form of quasi-prepolymers which are mixtures of polyisocyanates and polymeric polyisocyanates. Customarily a quasi-prepolymer is formed by adding less than a stoichiometric amount of polyol to polyisocyanate. All of the hydroxyl groups from the polyol are combined with available isocyanate groups from the polyisocyanate to produce polymeric isocyanates. The excess polyisocyanate remains unreacted because of the stoichiometric deficiency of polyol.

The coreactive ingredient for the polyisocyanate is an organic composition having reactive hydrogen groups as determined by the Zerewitinoff test. Customarily these are diols, triols, tetrols and occasionally higher polyols. They are frequently alkylene oxide adducts of polyols. They are frequently polyesters which are the polyesterification reaction products of polycarboxylic acids and polyols. They can also be polyester-polyethers. Drying oils also have been used for producing films by reaction with polyisocyanates.

The polyurethane is prepared by mixing the polyisocyanate with the coreactive organic compound such that the reactive hydrogens approximately offset the available isocyanate groups. The starting material should be essentially anhydrous inasmuch as the presence of water will cause undesirable foaming. Catalysts for the reaction of —NCO groups and reactive hydrogen groups also are included.

Liquid Crystals

The selected liquid crystals are the same as those described in the U.S. Pat. No. 3,872,050 which is incorporated herein by reference, particularly, column 4, line 30 through line 43; column 5, line 33 through line 63. Such liquid crystals are commonly known as cholesteric esters. The liquid crystals may include suitable dark dyes, about 0.5 to 5 percent by weight, to improve the visibility of the color response of the liquid crystals. Black dyes are preferred.

The liquid crystals constitute from 20 to 50 percent by weight of the film-forming mixture.

Film Forming

The present films preferably are formed between two previously formed thin films of plastic substances such as polyethylene terephthalate films, polyethylene films, cellophane films, polyurethane films, acrylic films and the like. One of the films may be dyed black to supply a black background for improving the visible response of the color phenomena of the liquid crystals. The present films may be employed as a sandwich between two permanently bonded outer protective films or alternatively the present films may be separated from the films between which they are formed and thereafter be employed as flexible, elastic films for a variety of uses such as temperature mapping of irregular surfaces—particularly in medical diagnosis work. The films may be used in nondestructive testing of surfaces such as motor vehicle components, airplane components, structural members and the like. The films have utility as novelty items and toys, for example in jewelry and in fabric decorations. Such films may be applied directly to cloth to serve as novelty wearing apparel.

As shown in FIG. 1 the present films are prepared between a pair of flexible films 10, 11. A supply of a mixture of polymerizing polyurethane elastomer containing discrete aggregates of liquid crystals is applied to the bottom film 10 as a ribbon 12. The material commences polymerization as soon as the polyisocyanate is admixed with the coreactive material such as the polyol. Before the polymerization reaction is completed, the ribbon 12 is covered with a top flexible film 11 and the resulting sandwich (the films 10, 11 and the polymerizing mass 12) is squeezed between a pair of rollers 13, 14. The resulting sandwich 15 is drawn forwardly by means of a pair of rubber coated driving rolls 16, 17 which produce a product sandwich 18 which can be coiled or cut into suitable shapes.

Preferably the bottom film 10 contains black pigmentations or dyes to supply the enhanced color response for the liquid crystals. Preferably the top film 11 is transparent to permit observation of the visible color response of the resulting film.

In a preferred embodiment, the ribbon 12 of polymerizing material is in a heated state, above room temperature; the compression rolls 13, 14 are cooled to a lower temperature in order to minimize any tendency for the compressed film to relax and allow the dispersed liquid crystal aggregates to regain their spherical shape.

The ingredients may be dissolved or dispersed in a volatile solvent to facilitate handling. When solvents are employed, the solvent mixture is spread on a substrate while the polymerization reactions are progressing. The solvent volatilizes as the polymerization continues and a residual film of polymerizing ingredients remains on the substrate. That residual film is then stressed, for example by passing through the nip of a pair of opposed rollers to generate the desired product which is allowed to complete its cure in the stressed condition.

Optimally the polymerizing polyurethane medium with the dispersed liquid crystal aggregates should have a viscosity from 1,000 to 10,000 poise at 60° C. when the mechanical stress is applied. The compression rolls 13, 14 are preferably maintained by at least 20° and preferably 30°–100° C. cooler than the polyurethane ribbon 12.

EXAMPLE 1

A pilot installation as illustrated in FIG. 1 was assembled including compression rolls 13, 14, each 6 inches long and 2 inches in diameter with an adjustable gap therebetween. Two rubber pulling rolls 16, 17, each 6 inches long and 1.5 inches in diameter, were urged into contact by means of springs. The compression rolls 13, 14 were cooled by means of an air blower mounted beneath them.

The top film 11 was 4 inches wide, 3 mil thick cellulose acetate. The bottom film 10 was 4 inches wide, 3 mil thick black acrylic film.

The ribbon 12 contained the following ingredients which were mixed by hand at 100° F. for about 2 minutes until the mixture appeared to be homogeneous.

2 grams of a polyisocyanate consisting of a prepolymer of toluene diisocyanate and polyoxypropylene diol having a free —NCO content of 5.5 percent;

1 gram of a hydroxyl-terminated butadiene/acrylonitrile copolymer having a hydroxyl equivalent of 1,889 and containing 85 percent by weight butadiene and 15 percent by weight acrylonitrile;

1 gram of a polytetramethylene ether glycol having a hydroxyl equivalent of about 500;

2 grams of a liquid crystal mixture consisting of
75 percent by weight cholesteryl linoleate,
12.5 percent by weight cholesteryl chloride,
12 percent by weight cholesteryl nonanoate,
0.5 percent by weight Sudan black B, a dark dye;

The mixture also included 0.06 grams of a polyurethane catalyst consisting of a 33 percent by weight solution of triethylene diamine dissolved in dipropylene glycol.

The ingredients were mixed and placed in a vacuum oven at 29 inches mercury for 3 minutes to effect degassing. The ingredients then were heated to 60° C. for 4 minutes at which time the viscosity was estimated between 2,000 and 4,000 poise. This mixture was transferred at 60° C. to the top surface of the black acrylic film and the film was drawn through the compression rolls 13, 14 at a rate of 3 feet per minute. The compression rolls had a temperature of 20° C. The gap between the compression rolls was set at 12 mils. Thus the polyurethane elastomer film had a thickness of 6 mils and the resulting sandwich had a thickness of 12 mils. The laminate was allowed to cure at room temperature for 24 hours.

This three-layer film displayed reflected colors through the clear acetate film. The color appeared red at 28° C., green at 29° C., blue at 30° C. The blue color vanished at temperatures above 47° C. On recooling the film exhibited first blue, then green and finally red at the same temperatures as when the film was heated. The reflected colors were iridescent and bright and were superior in intensity to colors exhibited in similar films produced directly without being exposed to shear stresses as herein described.

EXAMPLE 2

The procedure of Example 1 was duplicated with several exceptions which will be noted. After degassing, the mixture was heated for 12 minutes at 60° C. at which time its viscosity was estimated to be from 10,000 to 20,000 poise. This mixture was cooled to 40° C. and thereupon was processed through the compression rolls as described in Example 1. The resulting film showed the same color change characteristics as that described in Example 1. This material however had color patterns of differing iridescent character. The differing intensities of iridescence created an attractive visual color display as the film was heated and cooled.

EXAMPLE 3

The following ingredients were mixed with a spatula in a glass beaker at 80° C. until visually homogeneous:
  1.7 gram N,N,N',N'-tetrakis[2-hydroxypropyl]ethylenediamine;
  0.03 gram triethylenediamine;
  0.8 gram polytetramethylene ether glycol, functionality of 2, molecular weight 650;
  0.35 gram cholesteric liquid crystal made from 50 percent (by weight) cholesteryl oleyl carbonate and 50 percent (by weight) cholesteryl nonanoate.

The resulting mixture was cooled to room temperature and mixed with 6.0 grams of a polyurethane prepolymer I until visually homogeneous. The polyurethane prepolymer was prepared by combining toluene diisocyanate and polytetramethylene ether glycol (functionality =2; molecular weight=1,000) to produce the prepolymer with a free —NCO content of 7.2 weight percent. The resulting mixture was degassed under vacuum and gently heated to 50° C. until the viscosity reached about 200 poise. That mixture was spread by spatula on a clear sheet of 3-mil polyethylene terephthalate and the mixture was covered with a sheet of 3-mil thick black polyethylene terephthalate. The sandwich (two polyethylene terephthalate sheets and the interposed mixture) was further heated by an infrared heater to about 60° C. for five minutes. Thereupon the sandwich was clamped between two steel plates (one-half inch thick) and squeezed so that the uncured mixture was compressed under considerable shear strains. The clamps were removed after 24 hours and the resulting sandwich (laminate) was recovered having a thickness of 25–30 mils, including the two polyethylene terephthalate sheets.

When viewed through the clear polyethylene terephthalate sheet, bright irridescent colors were observed upon heating and cooling the laminate. The colors were red at about 24° C., green at about 24.5° C., and blue at about 26° C. The weight percentage of the liquid crystal in the mixture was 4.8 percent.

EXAMPLE 4

Example 3 was repeated except that, after the degassing under vacuum, the mixture with a viscosity of about 1–5 poise was spread at room temperature without any shear stress with a hand roller between two sheets of polyethylene terephthalate film (one clear, one black). The thickness gradient of the mixture between the films was 20 to 50 mils. The material was allowed to cure at room temperature without stress for 24 hours. The resulting laminate was heated through the temperature range of 20° to 30° C. to determine visible responses. In the region of the laminate where the thickness was 22–30 mils, a very weak color response could be discerned upon very close inspection.

EXAMPLE 5

Example 4 was repeated except that the mixture contained 30 weight percent of the liquid crystal instead of 4.8 weight percent. Otherwise the laminate was prepared without any deliberate application of shear stresses. The resulting laminate exhibited bright color responses upon heating and cooling—comparable in intensity to those presented by the laminate of Example 3.

Thus, comparison of Examples 3, 4 and 5 indicates that economies of liquid crystal utilization can be achieved by practicing the present invention. The shear stressing of an elastomeric film according to this invention (EXAMPLE 3) achieves color responses at low liquid crystal concentrations (the order of 5 weight percent) which are comparable to the color response otherwise achieved with liquid crystal concentrations of 30 weight percent (Example 5). When the elastomer is formed without applying the shear stress of this invention (Example 4), no appreciable color response is achieved at liquid crystal concentrations of the order of 5 weight percent.

We claim:
1. A method for producing polyurethane film articles having discrete particles of liquid crystals dispersed therein comprising:
  preparing a polymerizing mixture of organic polyisocyanate; organic polyol having reactive hydrogen as determined by the Zerewitinoff test; a catalyst for the reaction of isocyanate radicals and the radicals containing reactive hydrogen; and at least 5 percent by weight dispersed liquid crystal;
  forming said polymerization mixture into a shape; and
  after the said polymerizing mixture has been partially cured but not fully cured, changing the shape of the mixture so as to introduce mechanical strains in the mixture and retaining the mixture in such shape until the polymerization is completed.
2. The method of claim 1 wherein the change of shape occurs by squeezing the polymerizing mixture between a pair of films.
3. The method of claim 2 wherein one of the said films is a black film.
4. The method of claim 1 wherein the polymerizing mixture is squeezed against a single film.
5. The method of claim 1 wherein the change of shape occurs by extruding the polymerizing mixture through an extrusion die.
6. The method of claim 1 wherein the polymerizing mixture which has been partially cured but not fully cured has a viscosity in the range of 1,000 to 10,000 poise measured at 60° C.
7. An elastomeric polyurethane film containing at least 5 percent by weight of discrete aggregates of liquid crystals uniformly dispersed therethrough produced in accordance with the process of claim 1.
8. The method of claim 1 wherein the said mixture includes at least 20 percent by weight dispersed liquid crystal.
9. The film of claim 7 containing at least 20 percent by weight of discrete aggregates of liquid crystals.

* * * * *